Jan. 1, 1924
J. M. FELL
TELEGRAPH REPEATER SYSTEM
Filed March 26, 1921
1,479,430
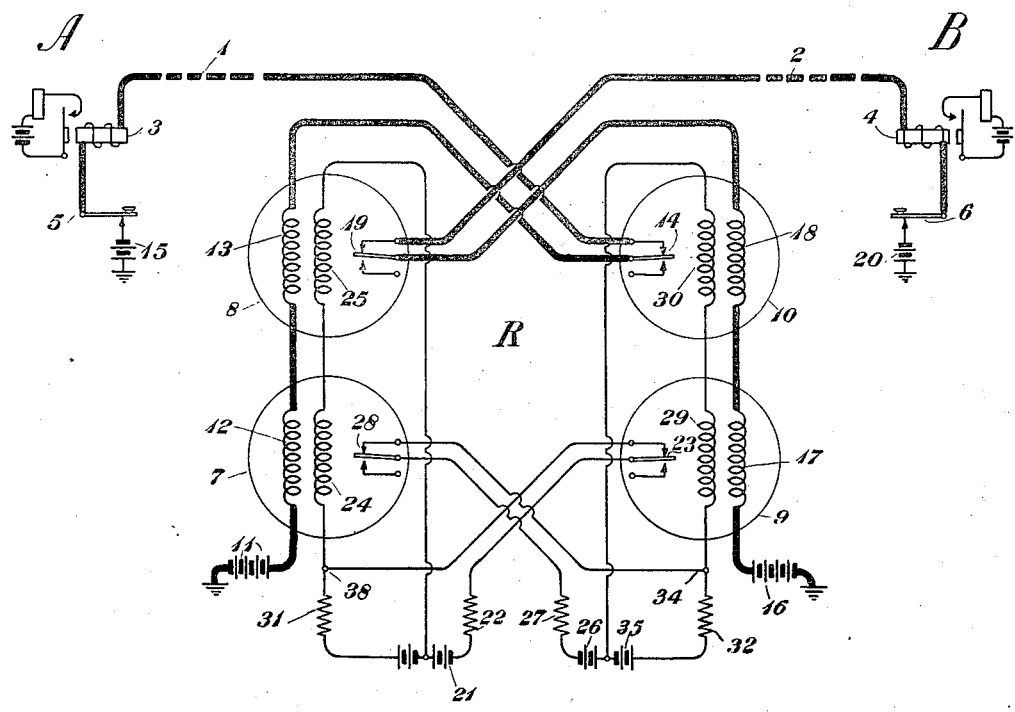
Inventor
J.M.Fell
By his Attorney Patented Jan. 1, 1924.

1,479,430

UNITED STATES PATENT OFFICE.

JOHN M. FELL, OF HACKENSACK, NEW JERSEY, ASSIGNOR TO AMERICAN TELEPHONE AND TELEGRAPH COMPANY, A CORPORATION OF NEW YORK.

TELEGRAPH REPEATER SYSTEM.

Application filed March 26, 1921. Serial No. 455,714.

*To all whom it may concern:*

Be it known that I, JOHN M. FELL, residing at Hackensack, in the county of Bergen and State of New Jersey, have invented certain Improvements in Telegraph Repeater Systems, of which the following is a specification.

This invention relates to telegraph systems, and more particularly to improved repeater organizations for retransmitting electrical impulses over oppositely extending telegraph lines.

In former types of repeater arrangements for single telegraph systems, it has been the practice to utilize neutral or non-polarized relays or combinations of such relays with other non-polarized instruments. In such practice it has been found that the neutral relays are less efficient than polar relays, being more sluggish in their action, and requiring more current to operate them. Accordingly, it is one of the objects of this invention to improve repeaters for single telegraph systems by substituting polar relays for the neutral relays commonly used, and by making such modifications in the circuit arrangements as will insure a more certain and efficient operation of the repeater. Other and further objects will be apparent from the following description when considered in connection with the accompanying drawing, in which is represented one embodiment thereof.

In carrying out the invention there are provided at a repeating station a plurality of relays which are arranged in pairs, and each relay has two windings. One winding of each relay of a pair is connected in series in a line circuit, and the other winding in series in a local circuit. The local windings of each pair of relays are connected to two batteries of opposite polarities. One battery of each local circuit is connected to the local windings of its pair of relays through a contact of the opposite pair of relays, and the other battery is directly connected to the local windings. The potentials of, or the resistances in series with, the two local batteries of each pair of relays are so proportioned that the current in the local winding acts in opposition to current in the line windings of the same relays when both battery circuits are closed, and acts in conjunction with the line current when one battery is open at the contact of the opposite pair of relays. Current in the line windings of each pair of relays is made to flow in a direction to move the armatures to close the operating contacts.

The invention is illustrated diagrammatically in the accompanying drawing, which shows the equipment necessary at a repeated point or station for practicing the features of this invention.

Referring to the drawing, R represents a repeating station having oppositely extending telegraph lines 1 and 2 connected therewith, said lines terminating at stations A and B, respectively. The stations A and B are provided, respectively, with the customary relays 3 and 4 and sending keys 5 and 6, together with other well-known apparatus which is not shown. The elements at the repeating station R, comprising the repeater thereat, are shown within the circles and consist of relays 7, 8, 9 and 10, which in the present instance are illustrated and described as of the polar type.

The invention will now be more fully understood from the following detailed description of its operation:

Assuming that key 5 at station A and key 6 at station B are closed, current flows from battery 11, through the line windings 12 and 13, respectively, of relays 7 and 8, contact 14 of relay 10, over line 1, winding of relay 3, key 5, battery 15 to ground. A circuit will also be closed from battery 16, through line windings 17 and 18, respectively, of relays 9 and 10, contact 19 of relay 8, over line 2, winding of relay 4, key 6, battery 20 to ground. In addition to the above, circuits will also be closed from battery 21, through resistance 22, contact 23 of relay 9, and local windings 24 and 25, respectively, of relays 7 and 8; and from battery 26, resistance 27, contact 28 of relay 7, and local windings 29 and 30, respectively, of relays 9 and 10. The resistances 31 and 32 are high as compared with resistances 22 and 27 respectively, consequently the potentials at junctions 33 and 34, and the direction of current in the local windings of relays 7 and 8 and 9 and 10, are determined by batteries 21 and 26, respectively. The line current flows through the relays in a direction to hold the armatures against their operating contacts, and the local current in a direction to oppose the line current. These currents are so regulated that the line current controls the relays to keep their contacts closed.

Should key 5 at station A be open, current would cease to flow in line 1 and in the line or operating windings of relays 7 and 8. Thereupon the current in the local windings of these relays would cause their armatures to move away from contacts 19 and 28, and relay 3 at station A would be released. Opening contact 19, opens line 2, causing current to cease flowing in that line and in the line windings of relays 9 and 10. Opening contact 28 opens the circuit previously outlined from battery 26 and permits current to flow from battery 35, through the local windings of relays 9 and 10, and since this current produces the same effect as was produced by the line current in relays 9 and 10, the armatures of these relays are not moved, but are kept against the operating contacts 23 and 14. Opening line 2 at contact 19 causes relay 4 at station B to release, thus producing the same affect at station B as was produced at station A by opening the key 5 thereat. When the key at A is again closed, the conditions first described are restored at the repeater R and at station B.

Opening key 6 at station B would produce the same effect in a converse manner at repeater R to that described in connection with the opening of key 5, and cause the release of relay 3 at station A, and closing key 6 at station B would restore the normal conditions at the repeater R and at station A. Thus telegraph signals which are produced by closing and opening the keys at either station for long or short intervals in predetermined combinations of these intervals are produced at the repeater R and at the opposite station.

In the system herein described, opening key 6 at station B, while key 5 at station A, assumed to be the sending station, is open, does not produce any effect at the repeater R, because so long as key 5 at station A is open, contact 28 of relay 7 is open, and current flows from battery 35 through the windings 29 and 30 of relays 9 and 10, respectively, and hold said relays operated in the manner above noted. When key 5 at A is again closed, even for the brief time required to make a dot, relays 7 and 8 will operate, and contact 28 of relay 7 will close the circuit from battery 26 through local windings of relays 9 and 10, and thus move their armatures to the open positions. Opening contact 14 opens line 1, and thus by rendering relay 3 at station A inoperative, the operator thereat is notified that the operator at station B is "breaking" and desires to use the line, and opening contact 23 causes relays 7 and 8 to be locked as before described in connection with relays 3 and 9, thus giving the operator at station B control of the circuit.

The preferred ratio of line current to spacing current or current opposing the line current is 2 to 1, and the preferred ratio of the spacing current to the holding current, or the current effective when spacing battery is disconnected is 2 to 1.

While the improved circuit as herein shown and described is of a specific arrangement, it will be understood that the same results may be obtained by other arrangements, such as connecting the respective windings of each pair of relays in parallel instead of in series, or by using one local battery and two local windings in each relay, or by using one relay with two armatures instead of a pair of relays in each side of the repeater.

What is claimed is:

1. In a telegraph repeating system having two line sections, a repeater comprising two pairs of relays interconnecting each section, each relay of a pair having a double winding serially connected with the corresponding winding of its associate, a line circuit for each pair of relays normally in control thereof, a local circuit for each pair of relays, normally opposed to the electro-magnetic action of the line circuit thereon, and means responsive to the opening of the line circuit at one section whereby each pair of relays is controlled by its respective local circuit and upon the subsequent closure of the line circuit whereby electrical impulses are repeated over the opposite line section.

2. In a telegraph repeating system having two line sections, a repeater comprising two pairs of polarized relays interconnecting each section, each one of the pair of relays having two windings serially connected to corresponding windings of the other one of the pair, a line circuit for each pair of relays serially connected to one of the windings thereof for normally controlling each of said pairs of relays, a local circuit for each pair of relays serially connected to the other windings thereof normally opposed to the electro-magnetic action of the associated line circuits on the relays of its respective pair, and means responsive to the opening of the line circuit at one section whereby each pair of relays is controlled by its respective local circuit and upon the subsequent closure of the line circuit whereby electrical impulses are repeated over the opposite line section.

3. A telegraph repeating system comprising two line sections, a pair of relays connected with each section, each one of the pair of relays having two windings serially connected to corresponding windings of the other one of the pair, a line circuit for each section normally closed through one winding of each relay of a pair, a local circuit for each of the other windings thereof normally closed and opposed to the electromagnetic action of the line circuit on each of said pairs of relays, means responsive to the opening of the line circuit at one section whereby each pair of relays is controlled by its respective local circuit and upon the subsequent closure of the line circuit at said section whereby electrical impulses are repeated over the opposite line section.

4. A telegraph repeating system comprising two line sections, a pair of relays connected with each section, each one of the pair of relays having two windings serially connected to corresponding windings of the other one of the pair, a line circuit for each section normally closed through one winding of each relay of a pair, a local circuit for each of the other windings thereof, the direction of current in said local circuits being opposed to the direction of current in the line circuits, means responsive to the opening of the line circuit at one section whereby each of said pairs of relays are controlled in opposite contact relation by their respective local circuits and upon the subsequent closure of the line circuit at said section whereby electrical impulses are repeated over the opposite line section.

5. A telegraph repeating system comprising two line sections, a pair of relays connected with each section, each relay having an armature and two windings, each of said windings being serially connected to corresponding windings of the other one of the pair, a line circuit for each section normally closed through one winding of each relay of a pair, a local circuit for each of the other windings thereof, a second local circuit for each pair of relays normally closed through the armature of one of the relays of the opposite pair, means responsive to the opening of the line circuit at one section whereby one pair of relays is controlled by one of the first mentioned local circuits and the second pair of relays is controlled by one of the second mentioned local circuits and upon the subsequent closure of the line circuit at said section whereby electrical impulses are repeated over the opposite line section.

In testimony whereof, I have signed my name to this specification this 23rd day of March, 1921.

JOHN M. FELL.